(12) United States Patent
Rao

(10) Patent No.: US 11,647,247 B1
(45) Date of Patent: May 9, 2023

(54) REMOTE CONTROL WITH INTEGRATED CAMERA

(71) Applicant: SLING TV L.L.C., Englewood, CO (US)

(72) Inventor: Padmanabha R. Rao, Palo Alto, CA (US)

(73) Assignee: SLING TV LLC., Englewood, CO (US)

( * ) Notice: Subject to any disclaimer, the term of this patent is extended or adjusted under 35 U.S.C. 154(b) by 0 days.

(21) Appl. No.: 17/712,530

(22) Filed: Apr. 4, 2022

(51) Int. Cl.
*H04N 21/422* (2011.01)
*H04N 21/4223* (2011.01)
*H04N 23/57* (2023.01)

(52) U.S. Cl.
CPC ... *H04N 21/42222* (2013.01); *H04N 21/4223* (2013.01); *H04N 21/42221* (2013.01); *H04N 23/57* (2023.01)

(58) Field of Classification Search
IPC .............. H04N 21/42204,23/66, 5/63, 21/4436, 21/42222, 23/651, 21/4432, 21/41265
See application file for complete search history.

(56) References Cited

U.S. PATENT DOCUMENTS

| | | | | |
|---|---|---|---|---|
| 2008/0174551 | A1* | 7/2008 | Ishibashi | H04N 21/42204 345/158 |
| 2012/0169482 | A1* | 7/2012 | Chen | G08C 17/02 340/12.52 |
| 2012/0327309 | A1* | 12/2012 | Ikeda | H04N 21/42204 348/E5.042 |
| 2017/0161724 | A1* | 6/2017 | Lau | G06Q 20/353 |

* cited by examiner

*Primary Examiner* — Samira Monshi
(74) *Attorney, Agent, or Firm* — Oliff PLC

(57) ABSTRACT

A remote control system for transmitting a signal to an electronic component, the remote control system including a remote control that includes a transmitter that transmits the signal to the electronic component, and at least one button configured to, upon user contact with the button, instruct the transmitter to transmit the signal. The remote control system also includes a camera disposed on or within the remote control. The camera is configured to image an environment within a predetermined distance of the remote control.

19 Claims, 8 Drawing Sheets

REMOTE CONTROL WITH INTEGRATED CAMERA

BACKGROUND

Cameras integrated into electronic devices such as cell phones or laptops may provide a variety of benefits, for example allowing a user to conveniently take images of an environment without the need of a separate camera. Cameras within cell phones, for example, may also be used to enable the user to show a video of herself during, for example, a videoconference using a videoconferencing application such as Zoom or Facetime.

In an entertainment environment such as a home entertainment environment, televisions may be provided with cameras in or external to the television display set, the camera having imaging capabilities. However, such camera imaging is not optimal for videoconferencing or other types of imaging given an often large distance from the camera to the user, for example when the user is sitting at a location viewing the television screen from a safe and comfortable distance.

Current remote controls that are used to transmit signals to control televisions and/or other electronic components such as a set-top box have integrated microphones to allow for the user to speak a command to the television and/or set-top box in lieu of pushing a button or series of buttons on the remote control. While this may improve efficiency between a user and her communication with the television and/or set-top box, versatility of the remote control can still be improved.

SUMMARY

Various embodiments described herein generally provide apparatuses, systems and methods to transmit a signal in an electronic environment, particularly by using a remote control system that communicates with a set-top box, television or other electronic component, the remote control system having a camera that will image a particular desired environment.

According to one embodiment, a remote control system for transmitting a signal to an electronic component is provided. The remote control system includes a remote control that has a transmitter configured to transmit the signal to the electronic component, and at least one button configured to, upon user contact with the button, instruct the transmitter to transmit the signal. The remote control system also includes a camera disposed on or within the remote control. The camera is configured to image an environment within a predetermined distance of the remote control.

According to one embodiment, a system for communicating via video is provided. The system includes a remote control having a camera disposed on or within the remote control, and an electronic component configured to receive at least one of a plurality of signals. The pluralities of signals include an image signal transmitted from the camera and an additional signal transmitted from the remote control. The image signal is further transmitted from the electronic component to a display of a recipient user.

According to one embodiment, a method for communicating via videoconference is provided. The method includes imaging, with a camera provided on or within a remote control, an image of a predetermined area. The method further includes transmitting, from the remote control to an electronic component, a signal representing an image of the predetermined area, and further transmitting the signal from the electronic component to a display. The method also includes displaying the image of the predetermined area on the display.

DETAILED DESCRIPTION OF EMBODIMENTS

Figure 1:
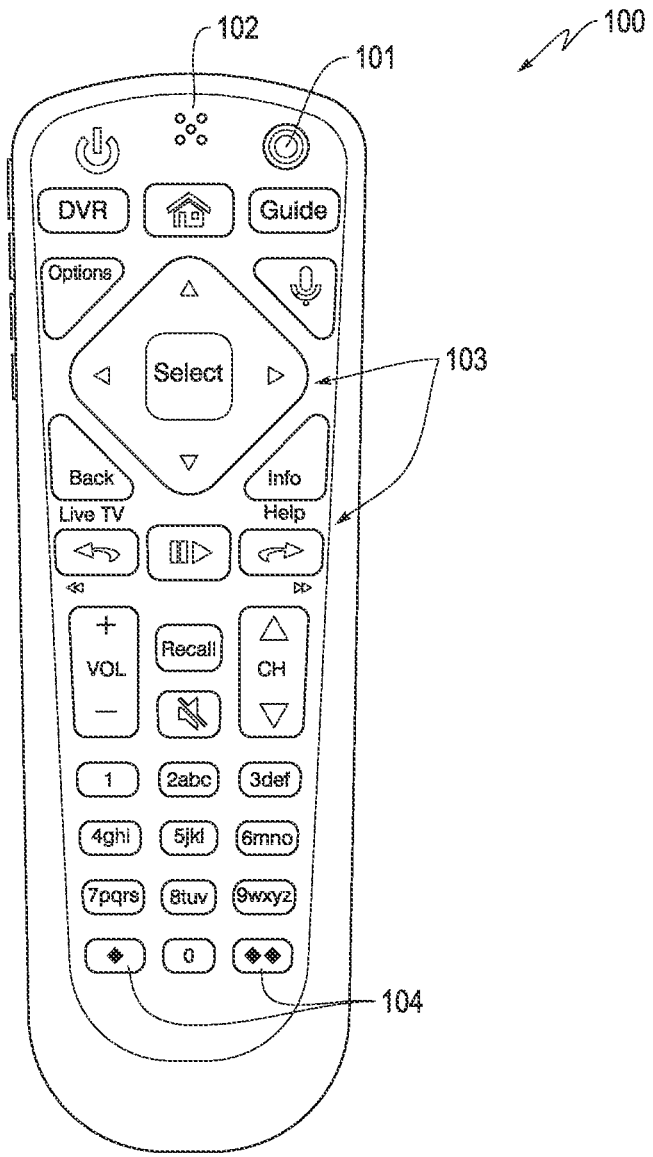
FIG. 1 shows a remote control according to one or more embodiments.

The various embodiments described herein generally provide apparatuses, systems and methods regarding a remote control and transmitting video images.

Interactivity between a user and a content provider may improve a user experience. Further, with the continually increasing use of videoconferencing as a method of communicating with others, an interactive system that can enable a user to more easily communicate via her home entertainment system, including via videoconferencing, can be advantageous.

In some examples, a user may stream content from the internet and/or otherwise view content stored on or transmitted through a set-top box. Such content will originate from a content provider, travel through a network, and reach a display of the user, such display being any one or more of, for example, a television screen, computer, tablet, or cellular phone, or any other viable display mechanism.

To improve the user experience, content providers may provide more than television programs through their networks. In some situations, content providers may provide a digital marketplace that includes options to purchase (or freely receive) content, products, and various other applications. In some examples, videoconferencing can be provided from the content provider either directly or via a third party application, optionally through the digital marketplace.

One example of a digital marketplace is a cloud-based store. The cloud-based store is a platform that can allow a user's television and/or gateway to allow bidirectional communication by providing a cloud-based platform having a marketplace that allows third party service providers (e.g., neighborhood yoga instructor, local hospital provider, national gym, etc.) to provide services to the users via an application created by such third party service providers (without hiring a programmer). In this regard, the third party service providers will be able to use the cloud-based platform to create, using their devices, their own interface that will be used by the consumers, and this interface allows the third party provider to provide a service to the consumer.

Once the application is developed by the third party server provider, the application is "pushed" or transferred to the subject user's set top box without the user requesting such applications and optionally without any cost to the user. This can provide a seamless and simple experience for the user. One example of an application that may be provided within the digital marketplace is a videoconferencing application, though a videoconferencing application may also be usable or accessible outside of the digital marketplace.

One advantage of videoconferencing is the ability for a recipient user to see a video image in addition to hearing audio content. Face-to-face interactions are still very desirable, and thus, a videoconferencing system where a recipient user can view a live or nearly-live image of the subject user can improve the user experience. Further, in some situations, imaging an area around the subject user may be particularly desirable, for example when a subject user wants to show a recipient user a particular item, a pet, or around her house generally.

Some television screens and/or set-top boxes may have a camera installed or may have an ability to mount an external camera thereon, which allows for images of the subject user to be taken from a fixed position. However, such a configuration has inefficiencies, as it involves additional components, and does not allow for versatility.

Many content providers issue a remote control to a subject user for the subject user to control the set-top box. Such remote controls often have a variety of functions, and can also integrate with a television screen to control a volume of the screen, power, input, and other television functions. User familiarity with a remote control is very high, and users will often have the remote control near or with them when viewing content.

Some remote controls have microphones included therein, so as to receive a command from a user. However, current remote controls lack any integration of a camera that can be used to image a particular environment, such as an image of or around a subject user, and can be easily used in a digital marketplace that includes a videoconferencing capability.

FIG. 1 shows a remote control 100 according to some embodiments. The remote control 100 may include a camera 101, a microphone 102, and buttons 103. The buttons 103 may be utilized to control various aspects of the user's display (such as a television) or set-top box, for example controlling the volume, the channel, accessing a guide or other information, and the like.

The buttons 103 may include, among other things, a button to access information or operations within the digital video recorder. The digital video recorder may be a function of the set-top box 210, described in further detail in FIG. 2, or may be its own hardware unit. In some situations, the button to access the digital video recorder will access content stored on a cloud or other remote storage component. The buttons 103 may also include a home screen button, which will enable the user to return to a home screen of a digital marketplace or a predetermined home screen. The home screen button may also allow for access to a menu. The buttons 103 may also include arrow buttons and select buttons to allow for a user to easily select a preferred option on the screen.

Further, the buttons 103 may include numeric buttons to allow for selection of particular channels or other predetermined functions, as well as fast forward, rewind and play/pause buttons which enable controlled playback and viewing of content.

The remote control 100 may also include programmable buttons 104, which may be preset by the content provider or may be settable by a subject user. The programmable buttons 104 may be buttons that can perform a preset operation, and/or may be buttons that can be programmed to perform a particular operation based upon a user's preference. The programmable buttons 104 may initiate personalized functions to improve the experience for viewing television or accessing and utilizing the digital marketplace and operations within the marketplace. In some situations, one or more of the programmable buttons 104 may initiate a videoconferencing application or another application as part of a digital marketplace. In other situations, one or more of the programmable buttons 104 may initiate the camera, for example, turn the camera on and begin imaging still and/or video images of a surrounding environment.

All buttons 103 and programmable buttons 104 may have a function of transmitting a signal to an electronic component, which may be a user set-top box and/or the display. The transmission may occur by radiofrequency (RF) transmission, infrared (IR) transmission, or another type of transmission including through a wireless internet network, a Bluetooth network, or another type of near field communication. The set-top box and/or display may respond by performing a function as desired by the user.

In some embodiments, the camera 101 may be integrated within the remote control 100. For example, the camera may be disposed within and/or on the remote control, with the camera lens exposed from a top face of the remote control. The camera 101 including its lens may be movable or fixed. The camera 101 may also be a rotary-type camera that may be mounted on the remote control, and thus may extend outward and be movable independently from the remote control 100. In either configuration, when the camera 101 is capable of movement, one or more of the buttons 103 or programmable buttons 104 may be used to control the motion of the camera 101. The camera 101 may also be hidden or mostly hidden within the remote control 100, with only the necessary imaging component being exposed.

The location of the camera 101 may be above a guide button of the remote control as shown in FIG. 1, but its location is not so limited. The camera 101 may be provided at the top center, or bottom center, or along the sides of the remote control 100. The camera may also be hidden in or otherwise embedded in one or more of the buttons 103, for example the select button or some other relatively centrally located button. The camera 101 may also be provided on a back face of the remote control 100.

Figure 2:
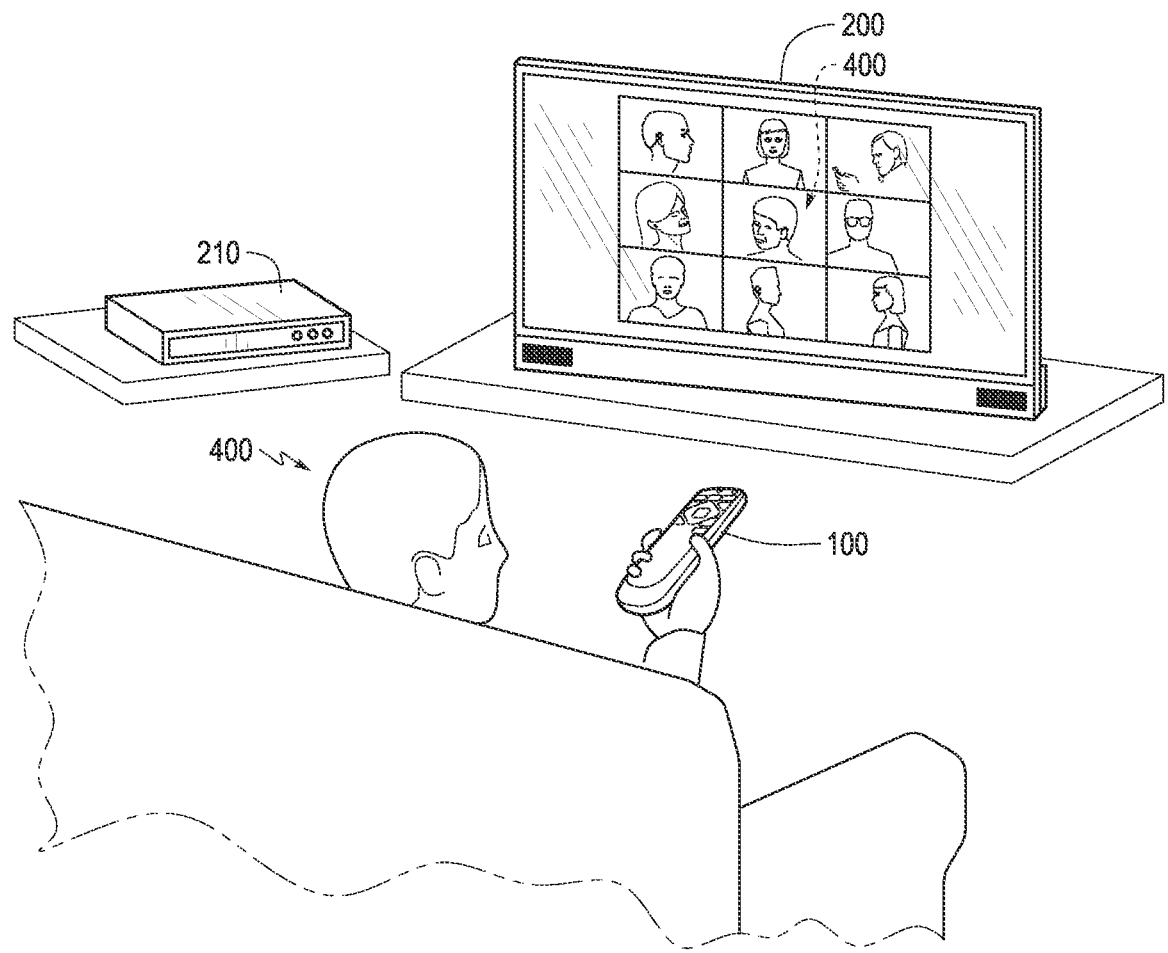
FIG. 2 is a pictorial diagram illustrating an environment where a remote control may be utilized.

Referring to FIG. 2, a subject user 400 is seated in a location, such as his living room, and is utilizing the remote control 100. As shown in FIG. 2, the content provider has provided a set-top box 210 for the subject user 400 to utilize, and the set-top box 210 allows for content to be provided to the user's display (e.g., television) 200. The set-top box 210 also allows for access to a digital marketplace. As shown in FIG. 2, the content provider may have established a digital marketplace where the subject user 400 is able to utilize a videoconferencing application. However, the videoconferencing application may also be available outside of the digital marketplace.

While some embodiments allow for the subject user 400 to access the videoconferencing application through a marketplace of the content provider, this disclosure is not so limited. The subject user 400 may, for example, also be able to access a videoconferencing application by connecting to the internet using a Smart TV, tablet, computer or the like, with the application being integrated with one or more functions being provided by the content provider, and/or integrated with functions of the remote control 100 including the camera 101. For example, images imaged by the camera 101 with the remote control 100 provided by the content provider may be transmitted to a recipient user through a network operated by the content provider. In some instances, images imaged by the camera 101 with the remote control 100 provided by the content provider may be transmitted to a recipient user directly through the internet without using the content provider's network.

As shown in FIG. 2, the subject user's display 200 shows images of various others, and represents a live videoconference. The subject user 400 is shown in the center of the videoconference on the display 200. The image of the subject user 400 shown on the display 200 is acquired by the camera 101 provided within the remote control 100. Thus, the subject user 400 has the ability to image himself, or another desired image (e.g., his pet, his notes, his house, or otherwise) and ensure that the image is easily displayed on the screen during the videoconference.

Figure 3:
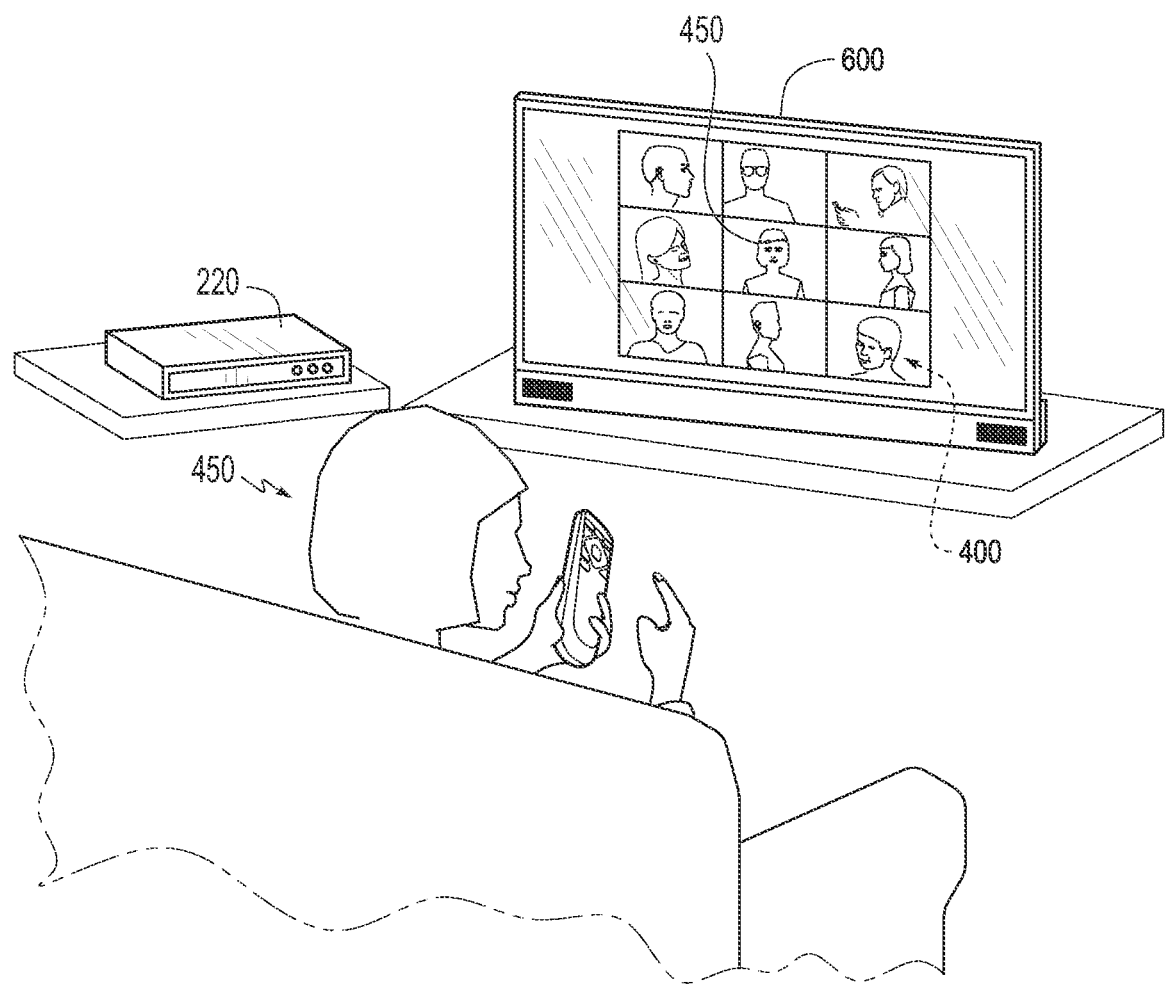
FIG. 3 is a pictorial diagram illustrating an environment of a recipient receiving an image signal on a display.

FIG. 3 shows a recipient user 450. In FIG. 3, the recipient user 450 is participating in the same videoconference as the subject user 400. The recipient user is able to view the live or nearly-live images of others in the videoconference, either via a similar digital marketplace provided by her content provider, for example using a set-top box 220, or by another method to allow access to the videoconference. For example, the recipient user 450 can view the image of the subject user 400, the image of the subject user 400 being obtained by the camera 101 provided within the remote control 100. On the display 600 of the recipient user 450, such an image of the subject user 400 is shown.

Owing to the configurations described above, ease of use of videoconferencing may be achieved. The subject user 400 may easily image himself and/or other desired aspects of his surrounding area or environment using the camera 101 integrated with or mounted on a remote control 100, which avoids the need for a separate camera which would necessarily require its own connections and communications with other components. By using the remote control 100 as the vehicle to take the images, hardware that is already required by the content provider can be additionally purposed to take video and/or still imaging, and such imaging can be transmitted through a network for others to view.

While FIGS. 2 and 3 shows an embodiment where a subject user 400 is participating in a videoconference having a plurality of users, the subject user 400 may also utilize the components described herein to participate in a one-on-one videoconference with the recipient user 450. The subject user 400 may be able to easily utilize the remote control 100 and camera 101 therein to provide an appropriate image of the subject user 400 to the recipient user 450. This may be of particularly advantageous utility to older or infirm users, as they will be able to communicate with others and show live or nearly live video images of themselves using the same remote control 100 as is used to control the display 200 and/or set-top box 210, without the need for additional electronics to be installed or otherwise requiring multiple steps to connect to and properly hold a video conference.

Figure 4:
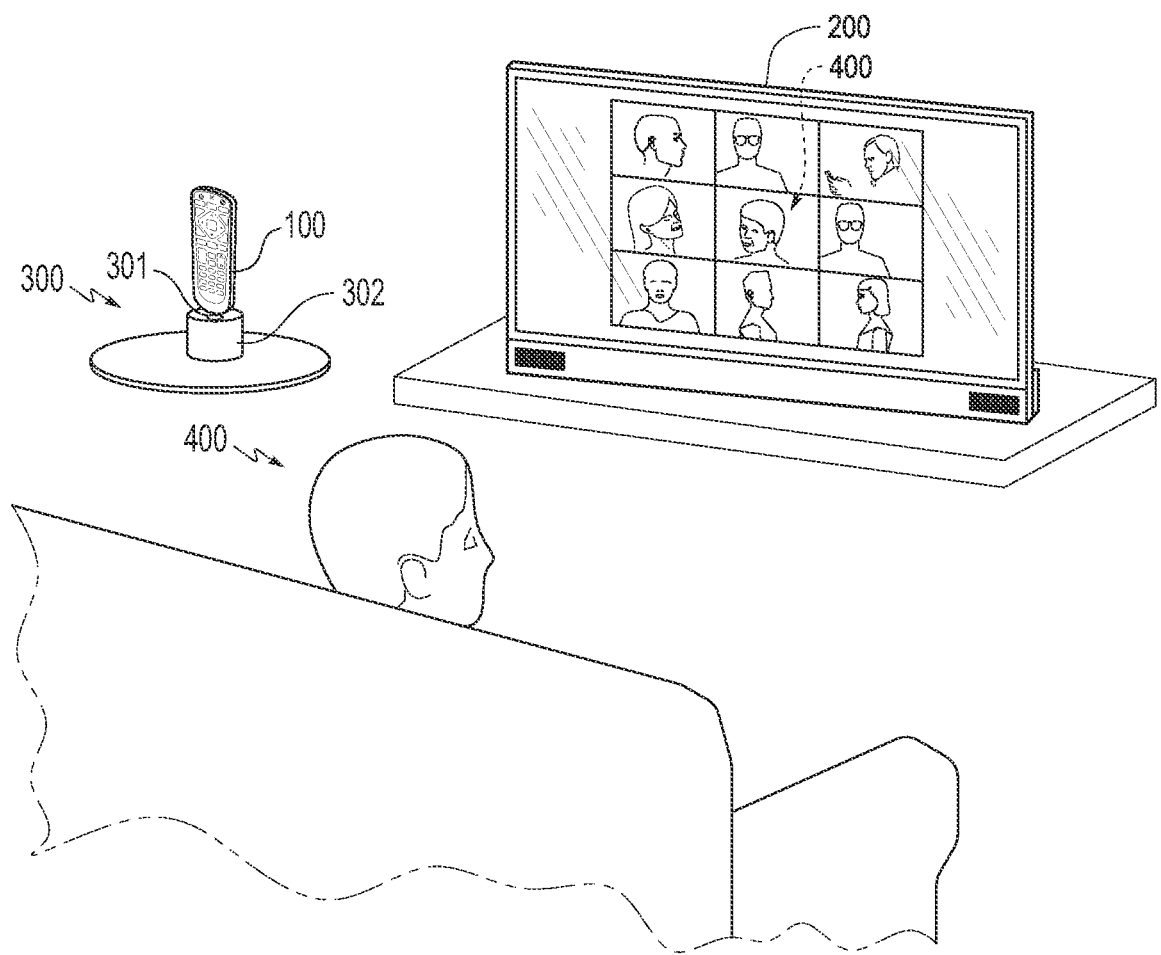
FIG. 4 is a pictorial diagram including a stand for a remote control according to one or more embodiments.
Figure 5:
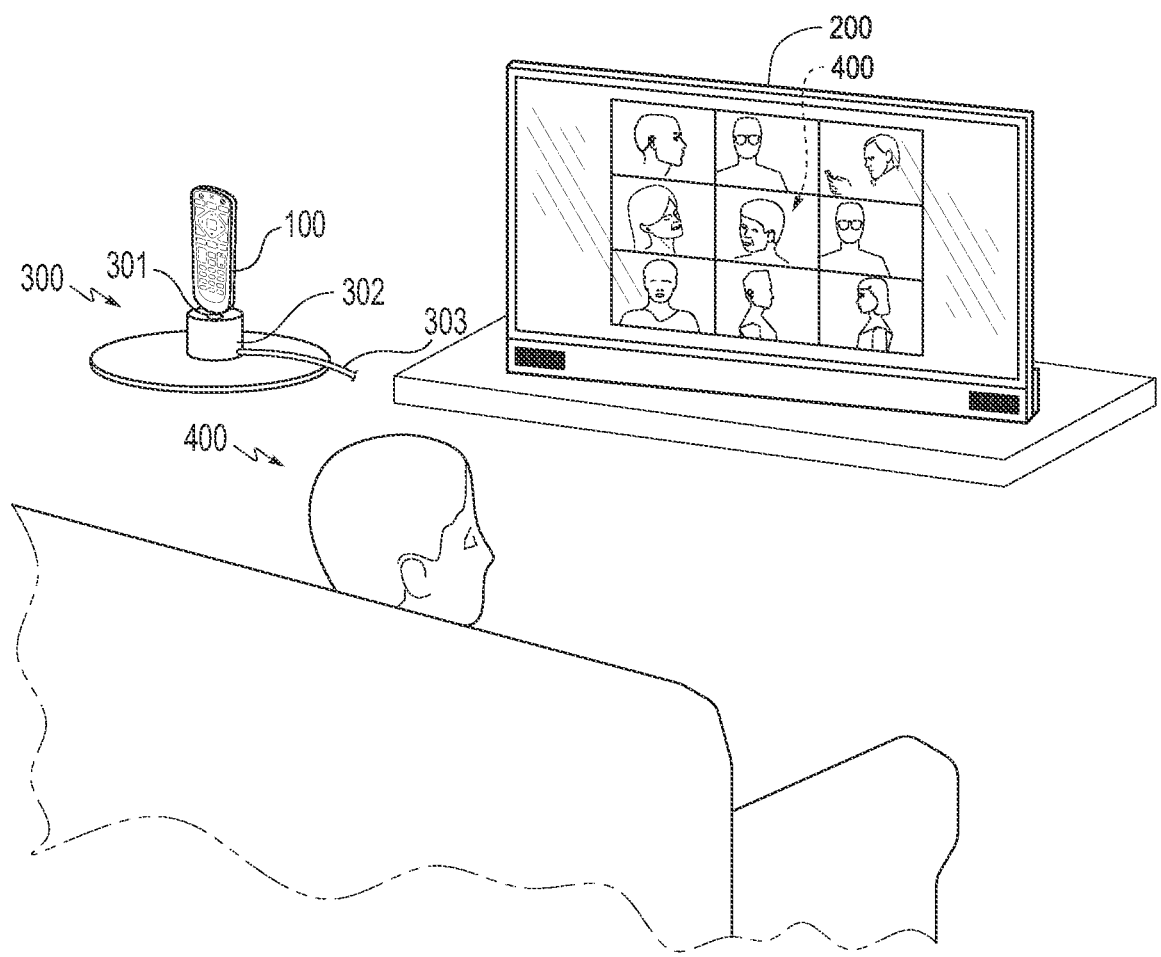
FIG. 5 is a pictorial diagram including a stand with a charging portion according to one or more embodiments.

Referring to FIGS. 4 and 5, a docking stand 300 for the remote control 100 may be provided. The docking stand 300 may be somewhere accessible to the user 400, and may be fixed or moveable. As shown in FIG. 4, docking stand 300 may include a docking portion 301 and a pedestal portion 302. The pedestal portion 302 may be provided to ensure that the docking stand 300 will appropriately sit on a particular surface, such as a flat surface like a table surface, without tilting or tipping. The docking portion 301 will house the remote control 100 in an anchored position.

Further, as shown in FIG. 5, the docking stand 300 may optionally include a charging portion 303 that will allow, for example, for one or more of the remote control 100 and camera 101 to be charged, either using a wired connection as shown, or wirelessly.

Figure 6:
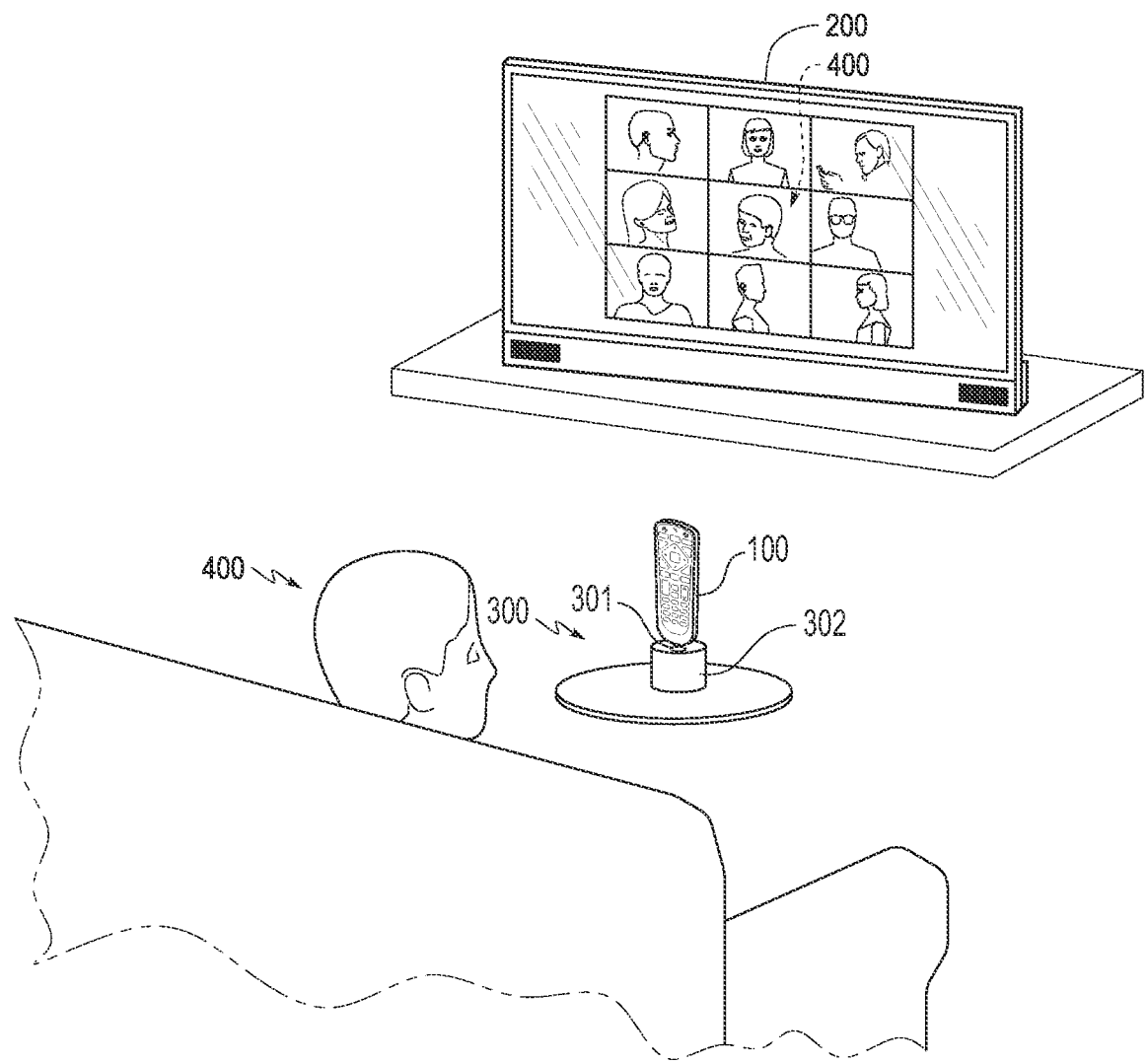
FIG. 6 is a pictorial diagram illustrating an environment where a remote control with a stand may be utilized.

As shown in FIG. 6, when housed in the docking stand 300, the remote control 100 may be appropriately positioned so that the subject user 400 will not need to hold the remote control 100 in his hand during the entire duration of, for example, a videoconference where the subject user 400 is being imaged by the camera 101. That is, the subject user 400 may be able to place the docking stand 300 on a floor or table in front of him, or otherwise in some position that allows the camera 101 of the remote control 100 to image a predetermined area while still allowing the subject user 400 to view the display 200.

Figure 7:
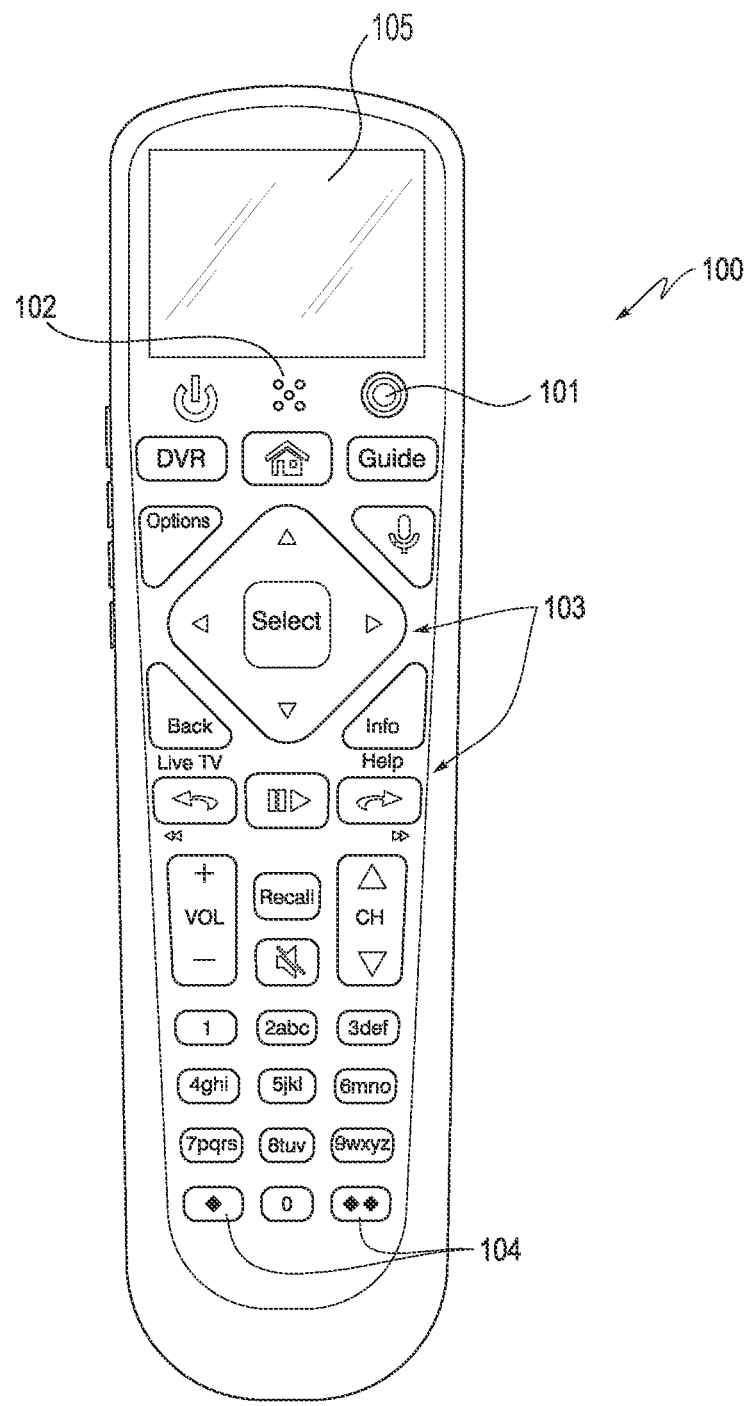
FIG. 7 shows a remote control according to one or more embodiments.

FIG. 7 shows a remote control 100 having a video screen 105 embedded therein. The video screen may be capable of communicating with the set-top box 210 or display 200 via wireless or Bluetooth or other near field technology, and may reproduce a smaller version of content being shown on the display 200. Thus, in situations where, for example, the subject user 400 is having a videoconference and is using the camera 101 to image himself, he may also see an image of the videoconference on the video screen 105 of the remote control 100, which will amount to a primary or secondary display and will alleviate a need for the subject user 400 to look away from the camera 101 in order to see the content being projected on the display 200. Further, this may be particularly desirable for users that have sight problems, as they can bring the video screen 105 of the remote control 100 very close to their eyes.

Figure 8:
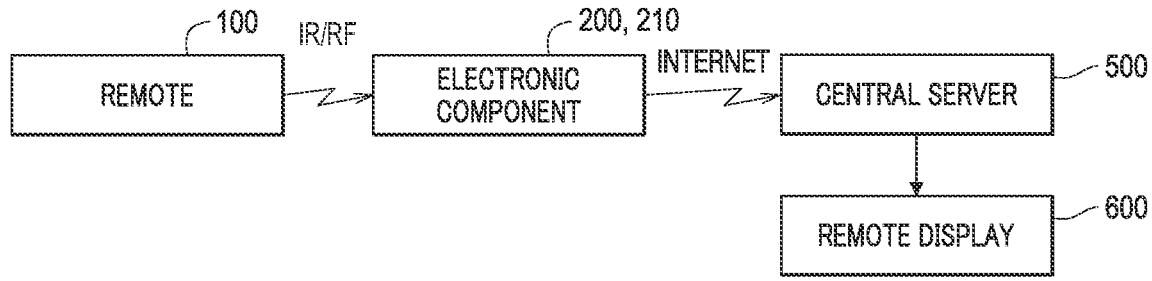
FIG. 8 is a diagram illustrating a system according to one or more embodiments.

As shown in FIG. 8, in some examples, the images captured by the camera 101 will be transmitted, via a transmitter, to the display 200 (for example, a screen) or set-top box 210 (each being representative of an electronic component) using RF, IR, or other communication technology. For example, the images may be transmitted to an RF or IR receiver of the display 200 or set-top box 210. The images may also be transmitted using wireless technology (e.g., thorough a wireless network to which one or more of the camera 101, display 200 and set-top box 210 are connected) or Bluetooth or other near-field technology. The images may then be further transmitted, via the internet or other communication network, to a central server 500 of the content provider. The images can then be transmitted from the content provider to an appropriate end location, for example the display 600 of the recipient user. The transmitter may be the same transmitter as a transmitter of the remote control, or may be a separate transmitter (within its own circuitry) of the camera.

In other examples, the system may allow for the images captured by the camera 101 and/or associated or unassociated audio data to be transmitted to the display 200 or set-top box 210, and then directly transmitted to the appropriate end location, for example the display 600 of the recipient user 450, using the internet or other viable network. As an example, users within the same local area network, Bluetooth network, wireless network or the like, may be able to receive and transmit the images to each other without the images being routed through a content-provider's back-end server.

In still other examples, the remote control 100 and/or the camera 101 provided therein may have its own wireless internet or other network capability and may be able to transmit the images and/or associated or unassociated audio data to the central server 500 or directly to the display 600 of the recipient user 450 without first transmitting the images to the set-top box 210 or display 200, for example via wireless internet or another network connection. That is, contrary to what is shown in FIG. 8, the transmission through the set-top box 210 or display 200, and optionally also the central server 500, may be bypassed entirely.

In some examples, the camera 101 will be capable of transmitting the recorded images to the set-top box 210 and/or display 200, for example to a storage unit embedded therein, or otherwise to a remote storage unit, for example one stored within a cloud server operated by a content provider. Thus, the recorded images may be held for either short-term or long-term storage. This can advantageously enable applications whereby a subject user 400 may want to pre-record a message (such as a "Happy Birthday" message) with video using the camera 101, and then send the video message at a later time. The user may be able to access an application using the digital marketplace to schedule and/or send the message at the desired time.

Figure 9:
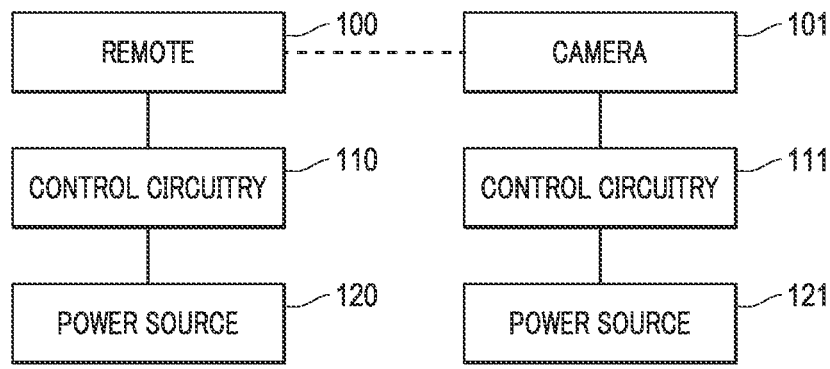
FIG. 9 is a diagram illustrating a configuration of a remote control according to one or more embodiments.

FIG. 9 is a diagram that shows the components of the remote control 100 and camera 101. In some embodiments, the remote control 100 and camera 101 have control circuitry that is independent and distinct from each other. For example, the remote control may include control circuitry 110 and the camera may include control circuitry 111. In some embodiments, control circuitry 110 may include hardware including one or more of a RF transmitter, RF receiver, IR receiver, IR transmitter, microcomputer, and driving circuit. The remote control 100 may also have its own power source 120, which may be a battery. The battery may or may not be rechargeable. The power source may also be another type of power source, such as AC power or another type of DC power.

In some embodiments, the control circuitry 111 of the camera 101 may include hardware including one or more of a transmitter, a receiver, and a microcomputer. The transmitter and receiver may allow for RF or IR communication, and/or wireless and/or Bluetooth and/or other near field communication to the set-top box 210, display 200, and/or network capable of storing and/or transmitting data. The camera 101 may be programmed, via the microcomputer, to image either still or video images. Images may be taken at a predetermined rate, such as about 1, about 10, or about 100 images per second. Further, the control circuitry 111 may be controlled so as to only instruct the camera 101 to take images upon a user request (e.g., when the user transmits a signal using buttons 103 or programmable buttons 104), or upon a predetermined threshold being reached.

The camera 101 may have a power source 121, such as a battery. The battery may or may not be rechargeable. The power source may also be another type of power source, such as AC power or another type of DC power.

In some embodiments, the power source 120 may be the same as the power source 121. That is, the power source 120 powering the remote control 100 may be the same as the power source 121 powering the camera 101. This may improve efficiency of manufacture.

In other embodiments, however, the power source 120 powering the remote control 100 is different from, separate from and independent of the power source 121 powering the camera 101. This can allow for more versatility in design, which may allow, for example, the remote control 100 to use standard AA or AAA or other alkaline batteries as the power source 120, whereas the camera can use different batteries, such as a rechargeable battery and/or rechargeable alkaline battery as the power source 121. Thus, the power source 120 and power source 121 can be electrically isolated from each other, and the control circuitry 110 and 111 can similarly be electrically isolated from each other. Therefore, parts of the remote control 100 other than the camera 101 will be controlled by and powered by the control circuitry 110 and power source 120, respectively, while the camera will be controlled by and powered by the control circuitry 111 and power source 121, respectively.

Thus, in such a situation, a signal transmitted from the transmitter of the control circuitry 110 of the remote control 100 may travel using a different signal path than a signal transmitted from the transmitted of the control circuitry 111 of the camera 101. In this case, an electronic component (the set-top box 210, display 200, or other component capable of receiving a signal) will be configured to receive plural signals from the remote control system, with a first signal being transmitted from the transmitter of the control circuitry 111 of the camera 101, and a second, or additional, signal being transmitted from the transmitter of the control circuitry 110 of the remote control 100. As an example, the first signal may be to carry the still or video image data captured by the camera 101, and the second or additional signal may be a signal for accessing an application, changing a channel, or viewing content. Both signals may be transmitted via IR, RF or other communication protocol.

In this configuration, the camera 101 will advantageously not affect the life of the remote control's power source 120. Thus, user experience can be improved because the user does not have to replace batteries more often than would otherwise be necessary if the camera 101 were not included in the remote control 100. For example, the camera 101 can have its power source 121 charged upon depletion or after a predetermined time, without affecting the life or use of the remote control 100. In some situations, the battery life of the power source 121 and/or the battery life of the power source 120 can be displayed on the display 200 of the subject user 400 once a predetermined level of power is reached, so as to inform as to the need to replace and/or recharge batteries for each component.

In some examples, the power source 121 will be chargeable using the charging portion 303 of the docking stand 300. This may enable the camera 101 to be charged during use, for example when anchored during a video conference, which can be advantageous for lengthy uses of the camera 101. The docking stand 300 may also be used for charging when the camera 101 is not otherwise in use. Further, the docking stand 300 or another charging mechanism can be configured to charge only the power source 121 of the camera 101 when the power source 121 is removed from the remote control 100. For example, the power source 121 can be detached from the remote control 100 and/or the camera 101, and can be directly connected to the charging portion 303 without the power source 121 being within the remote control 100 or even within the camera 101. Thus, the power source 121 can be recharged even when the remote control 100 is being otherwise used.

Further, in embodiments where the power source 120 of the remote control 100 is rechargeable, the docking stand 300 can be configured to also charge the power source 120, either when within the remote control 100 or when separately detached therefrom. The power source 120 and power source 121 may also be charged by other means.

Figure 10:
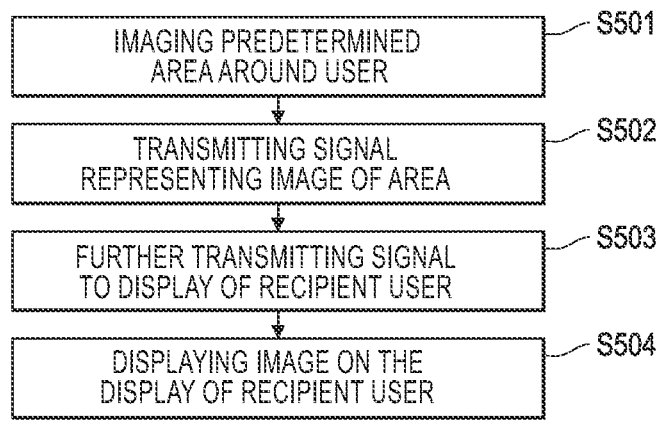
FIG. 10 is a flow diagram illustrating an exemplary method according to one or more embodiments.

FIG. 10 is an exemplary method that may be utilized for videoconferencing or another application. In a step S501, imaging an area may occur. This may occur using the camera 101 integrated with the remote control 100. The area may be a predetermined area within a vicinity of the remote control 100, such as 1-3 meters, 3-5 meters, 1-10 meters, or any distance within the imaging range of the camera 101. The imaging may occur upon the user initiating the use of the camera, for example by transmitting a signal using buttons 103 or programmable buttons 104. The imaging may also occur constantly at a predetermined frequency, such as about 1, about 10 or about 100 images per second. The images may be still images of video images. The images may be of a predetermined area, and/or may be images of the subject user 400, or of an environment around the subject user 400, depending on the positioning of the camera 101 at the time of imaging. The imaging may be repeated as necessary and/or as appropriate.

Once the imaging of the predetermined area has occurred, a signal including the image of the imaged area will be transmitted. The transmission may occur using the transmitter that is part of the control circuitry 111 of the camera 101, or may occur using other circuitry within the remote control 100. The transmission may be via RF, IR or other communication method. The transmission may be to a set-top box 210, the subject user's display 200, or a back-end or central server of the content provider.

In step S503, the signal will then be transmitted to a display of another user, such as display 600 of the recipient user 450. In some embodiments, the signal may be directly transmitted from the control circuitry 111 of the camera 101 to the display 600 of the recipient user 450, thus omitting step S503.

In step S504, an image will be displayed on the display 600 of the recipient user 450. The image will correspond at least partially to the image being images by the camera 101.

Owing to the embodiments described above, a user experience in a variety of applications can be advantageously improved. By utilizing a camera within a remote control, the user does not need to install a separate camera, nor does he need to deal with the complexities of a non-integrated system such as an external camera or a cellular phone. Allowing for an integrated camera within a remote control also avoids the aesthetic downgrade that installing a separate camera on a television screen or the like would require.

Further, because the user will often have the remote control nearby, the user will be able to seamlessly image himself or an appropriate area without requiring relocation, additional components, or the like. By having the camera in the remote control, the user can more clearly image himself or the appropriate image, as compared to a camera on a television screen or the like which may have resolution problems or otherwise not be able to provide a clear picture of the user or an intended area from a far distance, or may be prohibitively expensive in order to have the picture quality necessary to create an appropriate image from such a far distance.

The integration of the camera within the remote control may allow for additional user flexibility and/or improvement in utilizing the digital marketplace. For example, a user may be able to initiate a split-screen with videoconferencing on one side of the screen and a content program on another side of the screen at the same time, using the same remote control. The user may be able to easily pause the videoconference or the content program as appropriate without requiring additional hardware. The integration of the camera within the remote control can generally allow for improved versatility with respect to programming and use of the digital marketplace, without requiring additional components.

Further, while the instant embodiments were described with respect to videoconferencing, the instant disclosure is not so limited. The camera in the remote control may be utilized for other applications, such applications where providing and transmitting an image is desirable. This may include, among other things, an application run by an insurance provider to allow for images of damage to a house or other insured product to be taken and transmitted, via the application (either through the digital marketplace of the content provider or otherwise), to the insurance provider. Further, the camera may be utilized to aid in other remote control functions, such as providing hand signals to activate or otherwise utilize certain aspects of applications within the marketplace, which can allow for versatility beyond what a finite number of buttons on a remote control can produce.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A remote control system for transmitting a signal to an electronic component, the remote control system comprising:
   a remote control comprising:
      a transmitter configured to transmit the signal to the electronic component; and
      at least one button configured to, upon user contact with the button, instruct the transmitter to transmit the signal; and
   a camera disposed on or within the remote control,
   wherein the camera is configured to image an environment within a predetermined distance of the remote control,
   wherein the remote control includes a power source provided to power the remote control, the power source including a first power source and a second power source separate from the first power source,
   wherein the first power source interacts with circuitry of the camera to provide power to the camera,
   wherein the second power source interacts with circuitry of the remote control to provide power to the remote control,
   wherein the first power source includes a first battery, and the second power source includes a second battery distinct from the first battery.

2. The remote control system according to claim 1, wherein the circuitry of the remote control is electrically isolated from the circuitry of the camera.

3. The remote control system according to claim 1, wherein the first battery includes a rechargeable battery.

4. The remote control system according to claim 1, wherein the second battery includes alkaline batteries.

5. The remote control system according to claim 1, wherein the transmitter is an infrared transmitter configured to transmit the signal to an infrared receiver of the electronic component, and the camera further includes an image signal transmitter to transmit an image signal representing the imaged environment via internet.

6. The remote control system according to claim 1, wherein the electronic component is a set-top box.

7. The remote control system according to claim 1, wherein the second battery is rechargeable.

8. A system for communicating via video, comprising:
   a remote control including a camera disposed on or within the remote control, the camera transmitting an image signal; and
   an electronic component configured to receive at least one of a plurality of signals, the plurality of signals including the image signal transmitted from the camera and an additional signal transmitted from the remote control,
   wherein the image signal is transmitted to a display of a recipient user, and
   wherein the remote control includes a power source provided to power the remote control, the power source including a first power source and a second power source separate from the first power source,
   wherein the first power source interacts with circuitry of the camera to provide power to the camera,
   wherein the second power source interacts with circuitry of the remote control to provide power to the remote control,
   wherein the first power source includes a first battery, and the second power source includes a second battery distinct from the first battery.

9. The system according to claim 8, wherein the image signal is transmitted from the camera to the electronic component, and the transmission of the image signal from the camera to the electronic component is a transmission via internet.

10. The system according to claim 8, wherein the image signal is transmitted from the remote control to the display of the recipient user via internet, without being transmitted to the electronic component.

11. The system according to claim 8, wherein the additional signal is an IR or RF signal that interacts with the electronic component separately from the image signal.

12. The system according to claim 8, further comprising a first circuitry and a second circuitry,
   wherein the first circuitry receives power from the first power source to power the camera, and the second circuitry receives power from the second power source separately from the first power source, the second circuitry configured to power parts of the remote control other than the camera.

13. The system according to claim 12, wherein at least one of the first power source and the second power source is a rechargeable power source.

14. The system according to claim 8, wherein the first battery includes a rechargeable battery.

15. The system according to claim 8, wherein the second battery includes alkaline batteries.

16. The remote control system according to claim 8, wherein the second battery is rechargeable.

17. A method for communicating via videoconference, the method comprising:
   imaging, with a camera provided on or within a remote control, an image of a predetermined area;
   transmitting, from the remote control to an electronic component, a signal representing the image of the predetermined area;
   further transmitting the signal from the electronic component to a display;
   displaying the image of the predetermined area on the display; and
   charging a power source of the camera, the power source of the camera being a separate power source from a power source powering other parts of the remote control, wherein the power source of the camera interacts with circuitry of the camera to provide power to the camera, wherein the power source of the camera is distinct from a power source of the remote control, wherein the power source of the camera includes a first battery, and the power source of the remote control includes a second battery distinct from the first battery.

18. The method according to claim 17, wherein the transmitting the signal from the remote control to the electronic component occurs using IR or RF transmission.

19. The method according to claim 17, wherein the further transmitting the signal from the electronic component to the display occurs via internet communication.

\* \* \* \* \*